United States Patent
Takato

(10) Patent No.: US 6,847,784 B2
(45) Date of Patent: Jan. 25, 2005

(54) FOCUS DETECTING OPTICAL SYSTEM AND CAMERA PROVIDED WITH THE SAME

(75) Inventor: Hideyasu Takato, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/728,756

(22) Filed: Dec. 8, 2003

(65) Prior Publication Data

US 2004/0175167 A1 Sep. 9, 2004

(30) Foreign Application Priority Data

Dec. 18, 2002 (JP) ........................................ 2002-366601

(51) Int. Cl.$^7$ .............................................. G03B 13/36
(52) U.S. Cl. ...................................... 396/114; 348/345
(58) Field of Search ................................. 396/111, 114, 396/345

(56) References Cited

U.S. PATENT DOCUMENTS

| | | | | |
|---|---|---|---|---|
| 4,474,448 A | * | 10/1984 | Momiyama | 396/114 |
| 4,699,493 A | | 10/1987 | Koyama et al. | 354/406 |
| 4,716,431 A | | 12/1987 | Shindo | 354/407 |
| 4,849,782 A | | 7/1989 | Koyama et al. | 354/408 |
| 5,745,805 A | * | 4/1998 | Iyama | 396/97 |
| 6,453,124 B2 | * | 9/2002 | Morimoto et al. | 396/91 |

FOREIGN PATENT DOCUMENTS

| | | |
|---|---|---|
| JP | 60-032012 | 2/1985 |
| JP | 62-032013 | 2/1987 |

* cited by examiner

Primary Examiner—W. B. Perkey
(74) Attorney, Agent, or Firm—Kenyon & Kenyon

(57) ABSTRACT

A focus detecting optical includes a condenser lens placed in the proximity of a preset imaging plane equivalent to the imaging plane of a photographic lens, a pair of aperture stops dividing the pupil of the photographic lens placed on the exit side of the condenser lens into two areas, and a pair of re-imaging lenses for forming two secondary object images corresponding to the aperture stops, and satisfies the following conditions:

$0.45 < |mg| < 0.75$ $0.75 < |R1/R2| < 1.25$ $|R3/R4| \leq 0.02$ where mg is an imaging magnification of the focus detecting optical system, R1 is the radius of curvature of the entrance surface of the condenser lens, R2 is the radius of curvature of the exit surface of the condenser lens, R3 is the radius of curvature of the entrance surface of each of the re-imaging lenses, and R4 is the radius of curvature of the exit surface of each of the re-imaging lenses.

13 Claims, 5 Drawing Sheets

FOCUS DETECTING OPTICAL SYSTEM AND CAMERA PROVIDED WITH THE SAME

BACKGROUND OF THE INVENTION

1. Field of the Invention

This invention relates to a focus detecting optical system used in a digital camera or a silver halide film single-lens reflex camera, and in particular, to a focus detecting optical system in which the pupil of a photographic lens is divided into two areas and two secondary object images are formed by light beams passing through the areas so that the relationship between the relative positions of the secondary object images is detected to thereby find the focus position of an imaging lens, and a camera provided with the focus detecting optical system.

2. Description of Related Art

There are conventional focus detecting optical systems in which the primary image formed by a photographic lens is re-formed into two images on a pair of image sensors through a re-imaging optical system including a condenser lens and a pair of re-imaging lenses so that the light intensity distributions of the two images are compared to make a correlation calculation and thereby a distance between the two images is found to obtain the amount of defocus. For example, when the distance between the two images derived from the calculation is represented by Y0 and the distance between the two images at a given point is represented by Y1, there is a correlation between a difference $\delta = Y1 - Y0$ and the amount of defocus, and thus focus detection can be made by finding the difference $\delta$.

In such focus detecting optical systems, in order to improve range measuring accuracy and to correct aberration, various proposals have been made as disclosed, for example, in Japanese Patent Kokai Nos. Sho 60-32012, Sho 62-25715, Sho 62-69217 (Japanese Patent Publication No. Hei 7-31300), Sho 60-32013, and Sho 62-79407.

In the focus detecting optical system disclosed in each of Kokai Nos. Sho 60-32012 and Sho 62-25715, in order to correct distortion, at least one surface of the condenser lens is configured as an aspherical surface, such as a hyperboloid of revolution or an ellipsoid.

In the focus detecting optical system disclosed in Kokai No. Sho 62-69217 (Publication No. Hei 7-31300), in order to correct distortion and chromatic aberration, entrance and exit surfaces of each of the re-imaging lenses are decentered. In the focus detecting optical system disclosed in Kokai No. Sho 60-32013, in order to correct distortion and chromatic aberration, the centers of stops and the R surfaces of the re-imaging lenses constructed with plano-convex lenses are decentered. In the focus detecting optical system disclosed in Kokai Sho 62-79407, in order to correct distortion and chromatic aberration, one surface of each of the re-imaging lenses is configured as a spherical surface and the other surface is configured as an inclined flat surface with a prism function.

By the recent development in semiconductor technology, great strides has been made in compactness and hyperfine structure of a solid-state image sensor used in a digital camera. Even in a single-lens reflex digital camera using the solid-state image sensor, there is a strong demand for compactness of the solid-state image sensor.

Here, in order to downsize the camera of this type, when an image circle is made smaller than in a conventional camera of 135F or APS size, for example, a camera that has the image circle of about a half, as compared with the case of 135F, is assumed. When the focus detecting optical system corresponding to the conventional camera of 135F is used, as it is, for any optical system including an image sensor for detection as the focus detecting optical system in an attempt to print a photographed image of the same size, an enlarging magnification is roughly doubled. When this photograph is viewed under a constant observing condition, the radius of an allowable circle of confusion must be thought of as about a half, as compared with the conventional case of 135F. Hence, although the radius of the allowable circle of confusion is reduced, a pixel pitch is relatively increased and thus detection accuracy is degraded. In this case, in order to prevent the degradation of detection accuracy, it is necessary to reduce the pixel pitch of the image sensor for detection or increase the imaging magnification of the focus detecting optical system. Consequently, in order to downsize the camera of this type, the focus detecting optical system corresponding to the conventional camera of 135F or APS size cannot be adopted.

Furthermore, when the pixel pitch of the image sensor for detection is decreased or the imaging magnification of the focus detecting optical system is increased, correction for distortion or chromatic aberration of the same extent as in the conventional focus detecting optical system may cause the error of range measurement, and more complete correction than in the conventional focus detecting optical system becomes necessary.

Therefore, in order to downsize the camera of the type, it is desired to provide a focus detecting optical system which has a high degree of focus detecting accuracy corresponding to a small image circle and in which aberration is completely corrected.

Although the conventional focus detecting optical system is proposed on the premise that the camera of 135F or APS size is used, no one has yet been able to produce a focus detecting optical system, based upon the premise that the camera of the type is downsized, in which aberration is corrected in accordance with this downsizing and range measuring accuracy is attained, and a camera provided with this focus detecting optical system.

SUMMARY OF THE INVENTION

The focus detecting optical system according to the present invention is designed to detect the focus position of a photographing optical system from the positional relationship between at least one pair of secondary object images. In this case, the imaging magnification of the focus detecting optical system satisfies Condition (1) described below and the focus detecting optical system includes a condenser lens satisfying Condition (2) described below, placed in the proximity of a preset imaging plane equivalent to the imaging plane of a photographic lens; a pair of aperture stops that are placed on the exit side of the condenser lens and that divide the pupil of the photographic lens into two areas; and a pair of re-imaging lenses satisfying Condition (3) described below to form two secondary object images corresponding to the aperture stops:

$$0.45 < |mg| < 0.75 \quad (1)$$

$$0.75 < |R1/R2| < 1.25 \quad (2)$$

$$|R3/R4| \leq 0.02 \quad (3)$$

where mg is an imaging magnification of the focus detecting optical system, R1 is the radius of curvature of the entrance surface of the condenser lens, R2 is the radius of curvature of the exit surface of the condenser lens, R3 is the radius of curvature of the entrance surface of each of the re-imaging lenses, and R4 is the radius of curvature of the exit surface of each of the re-imaging lenses.

In the focus detecting optical system, when the imaging magnification of the focus detecting optical system is increased, focus detecting accuracy can be improved. On the other hand, the amount of light to be obtained is decreased, the focus detecting accuracy is impaired with respect to a dark object. Thus, when the image circle of moderate size is formed, it is desirable that the imaging magnification of the focus detecting optical system satisfies Condition (1). By doing so, favorable focus detection can be made with respect to various object conditions.

Further, the focus detecting optical system of the present invention further includes a light-receiving element having a light-receiving surface, and satisfies the following condition:

$$|\Delta|<1.55\lambda \qquad (4)$$

where $\Delta$ is the difference of the position of the center of gravity between spots of the C and F lines on the surface of the light-receiving element and $\lambda$ is a wavelength of the E line.

Still further, the focus detecting optical system of the present invention satisfies the following condition:

$$3.50\times 10^{-4} > |\delta d/D| \qquad (5)$$

where $\delta d$ is an image height error (mm) on the most peripheral side of a range measuring area and D is a distance (mm) between two images made by the pair of re-imaging lenses.

It is desirable that the focus detecting optical system of the present invention has a plurality of sets, each of which is a combination of the pair of aperture stops with the pair of re-imaging lenses corresponding thereto, so that, in each set, centers of the aperture stops and the re-imaging lenses corresponding thereto are decentered from the optical axis of the photographic lens and the amount of decentration varies with each set.

It is desirable that the focus detecting optical system of the present invention further includes a light-receiving element having a light-receiving surface, and satisfies the following condition:

$$0.85<LTL/fl<1.75 \qquad (6)$$

where LTL is the optical path length (a length from the preset imaging plane to the light-receiving surface) of the focus detecting optical system and fl is the focal length of the entire focus detecting optical system.

In the focus detecting optical system, the re-imaging lenses are preferably placed so that the optical axis of each of the re-imaging lenses is decentered farther away from the center of each of the aperture stops with respect to the optical axis of the photographic lens.

The camera according to the present invention includes the focus detecting optical system, a finder optical system, the photographic lens, a path splitting means splitting the optical path of the photographic lens to direct the optical path toward an image sensor or a film and toward the finder optical system, and a reflecting means conducting the optical path of the photographic lens to the focus detecting optical system.

The camera according to the present invention preferably has the diameter of the image circle that is about a half of that of the image circle of the 135 format camera.

The camera according to the present invention includes an image sensor provided with a light-receiving surface receiving light from a photographing optical system and the focus detecting optical system detecting the focus position of the photographing optical system from the positional relationship between at least one pair of secondary image objects with light from the photographing optical system. In this case, the diameter of the image circle of the camera is about a half of that of the image circle of the 135 format camera.

The diameter of the image circle of the camera is governed by the imaging region (area) of the image sensor. When the image circle is reduced, the entire camera including the photographing optical system can be downsized. However, when the image circle is extremely small, the blurring of the background of an object is weakened and the variation of a photographing expression is narrowed. On the other hand, when the imaging area of the image sensor is increased, the entire camera is enlarged. Consequently, power consumption and fabrication cost are increased. It is desirable that the size of the image circle is determined by considering that the image circle is observed by the human eye.

In order to maintain the balance between downsizing and the variation of the photographing expression, it is only necessary that the diameter of the image circle, as in the present invention, is about a half of that of the image circle of the 135 format camera. Specifically, the diameter of the image circle (which coincides with the diagonal length of the imaging area of the image sensor) is in the range from 18 mm to 23 mm.

In the camera according to the present invention, the focus detecting optical system preferably satisfies Condition (1).

The camera according to the present invention is preferably provided with a reflecting mirror reflecting light from the photographing optical system to conduct the light to the focus detecting optical system.

In the camera according to present invention, the reflecting mirror is preferably moved to conduct the light from the photographing optical system to the image sensor.

According to the present invention, by a novel, small image circle which has never been used in the focus detecting optical system based upon the premise that the conventional camera of 135F or APS size is provided, a high degree of accuracy of range measurement accommodating the photographing optical system in which the allowable circle of confusion is small can be obtained, and distortion or chromatic aberration is kept to a minimum accordingly. The present invention is capable of providing such a high-performance focus detecting optical system and a camera provided with this focus detecting optical system.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
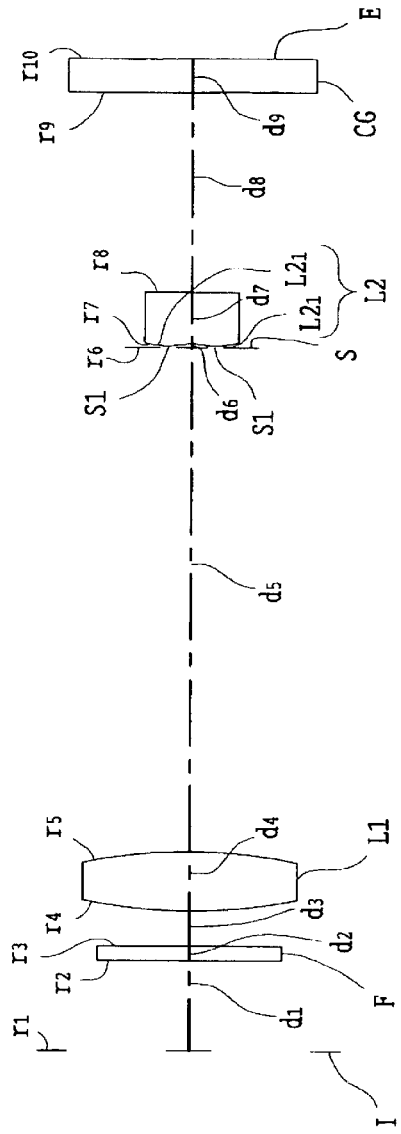
FIG. 1A is a sectional view showing an optical arrangement, developed along the optical axis, of the focus detecting optical system of a first embodiment in the present invention.

Before undertaking the description of the embodiments, the function and effect of the present invention will be explained below.

In the focus detecting optical system like the present invention, it is necessary to correct aberrations of two types in the main. One of them is distortion, also called an image height error. In the focus detecting optical system, a plane (a preset imaging plane) equivalent to the primary imaging plane (the imaging plane) of the photographic lens is assumed as a range measuring area. An image in this area is divided into two images through the second imaging lenses, such as the re-imaging lenses, provided in the focus detecting optical system, and these two images are formed on a light-receiving surface provided with a photoelectric converting element array which is a detection means. The relative positions of the two images are detected to thereby find the focus position of the photographic lens. In this case, if distortion is considerable, the center of the range measuring area will be different in size of the image from the periphery thereof and range measuring accuracy will be adversely affected. Consequently, it is necessary to suppress the production of aberration by both the condenser lens and the re-imaging lenses.

The other is chromatic aberration. When various photographing scenes are actually considered, it is conceivable that various light sources are used to perform photographing. When the focus detecting optical system itself has chromatic aberration, the position of range measurement varies with the photographing scene. Thus, the chromatic aberration of the focus detecting optical system must be corrected to some extent. Even though the focus detecting optical system is designed so that aberration is favorably corrected, this has no meaning unless the range measuring accuracy is ensured when the optical system is actually mounted in a camera. Therefore, the focus detecting optical system must be designed so that the sensitivity of the fabrication error is low and fabrication is easy.

The focus detecting optical system of the present invention can render a corresponding camera smaller than the conventional camera of 135F or APS size and satisfies the above conditions to improve the focus detecting accuracy.

One of the most important considerations in the improvement of the focus detecting accuracy is a magnification. The present invention is constructed so that it is assumed that focus detection is made by the photographing optical system in which the image circle is about a half, as compared with the case of 135F, and the magnification of the focus detecting optical system satisfies the following condition:

$$0.45 < |mg| < 0.75 \qquad (1)$$

where mg is an imaging magnification of the focus detecting optical system.

When it is assumed that focus detection is made by the photographing optical system in which the image circle, like the present invention, is about a half of the case of 135F, the amount of allowable defocus on the image plane is appreciably small.

If the magnification of the focus detecting optical system is below the lower limit of Condition (1), a detectable minimum amount of defocus governed by AF detecting accuracy becomes larger than the allowable circle of confusion. This is unsuitable for the focus detecting optical system of the present invention.

Beyond the upper limit of Condition (1), the detecting limit of the amount of defocus is narrowed down unless a light-receiving element array is increased, and in order to ensure a constant defocus detecting limit, oversizing of the light-receiving element array becomes necessary, which is unfavorable.

In the present invention, the condenser lens is designed to satisfy the following condition:

$$0.75 < |R1/R2| < 1.25 \qquad (2)$$

where R1 is the radius of curvature of the entrance surface of the condenser lens and R2 is the radius of curvature of the exit surface of the condenser lens.

If the difference between radii of curvature of both lens surfaces is made notable without satisfying Condition (2), the amount of production of off-axis aberration will be gradually increased, which is unfavorable.

The condenser lens is preferably constructed with a biconvex lens of identical radii of curvature so as to satisfy the following condition:

$$|R1/R2| = 1 \qquad (2')$$

When the condenser lens satisfies Condition (2'), the amount of production of distortion by both surfaces can be kept to a minimum. For chromatic aberration, the amount of production of aberration can be well balanced between C and F lines.

In the present invention, the re-imaging lenses are designed to satisfy the following condition:

$$|R3/R4| \leq 0.02 \qquad (3)$$

where R3 is the radius of curvature of the entrance surface of each of the re-imaging lenses and R4 is the radius of curvature of the exit surface of each of the re-imaging lenses.

Each of the re-imaging lenses is preferably constructed with a plano-convex lens satisfying the following condition:

$$|R3/R4| = 0 \qquad (3')$$

The re-imaging lenses are placed immediately behind the apertures of the aperture stops, but in order to correct an image height error and chromatic aberration at the same time, the optical axis of each of the re-imaging lenses constituting a re-imaging optical system is decentered farther away from the center of each of the aperture stops with respect to the optical axis of the photographic lens. In this case, when each re-imaging lens is constructed with the biconcave lens, both surfaces of the re-imaging lens, like the optical system set forth in Kokai No. Sho 62-69217 (Publication No. Hei 7-31300), must be decentered in order to correct chromatic aberration. However, when one of both surfaces is configured as a planar surface and only the convex surface is decentered from the aperture, the same effect as in the case of the biconvex lens can be secured with respect to chromatic aberration. Here, when the fabrication error is taken into account, the profile of the planar surface should be tolerated to have the radius of curvature to some extent in the limit of Condition (3).

In particular, since the re-imaging optical system corresponding to multiple AF is constructed so that a plurality of re-imaging lenses, for example, as many as 10 re-imaging lenses, are integrally molded as the case may be, it is advantageous, in view of fabrication, that the convex surface is combined with the planar surface. In such a case, it is desirable that the convex surface has the same radius of curvature in any re-imaging lens.

When the re-imaging lens is shaped to have, in order from the incidence side, the convex surface and the planar surface, the position of the primary point can be further shifted to the object side and the re-imaging lenses can be placed closer to the image sensor. Consequently, spacing between the condenser lens and the re-imaging lenses can be widened, and when the optical path is bent, sufficient space for a reflecting mirror placed immediately ahead of the re-imaging lenses is provided, increasing the number of degrees of path bending freedom.

When the condenser lens is combined with the re-imaging lenses, like the present invention, both distortion and chromatic aberration can be favorably corrected at the same time even in the focus detecting optical system in which the image circle is a half of the case of 135F.

It is desirable that the focus detecting optical system of the present invention satisfies the following condition:

$$0.55 < Lx1/Lx2 < 0.75 \tag{7}$$

where $Lx1$ is a distance (mm) from the preset imaging plane to the light-receiving element array and $Lx2$ is a distance (mm) from the preset imaging plane to the front surfaces of the re-imaging lenses.

Figure 4:
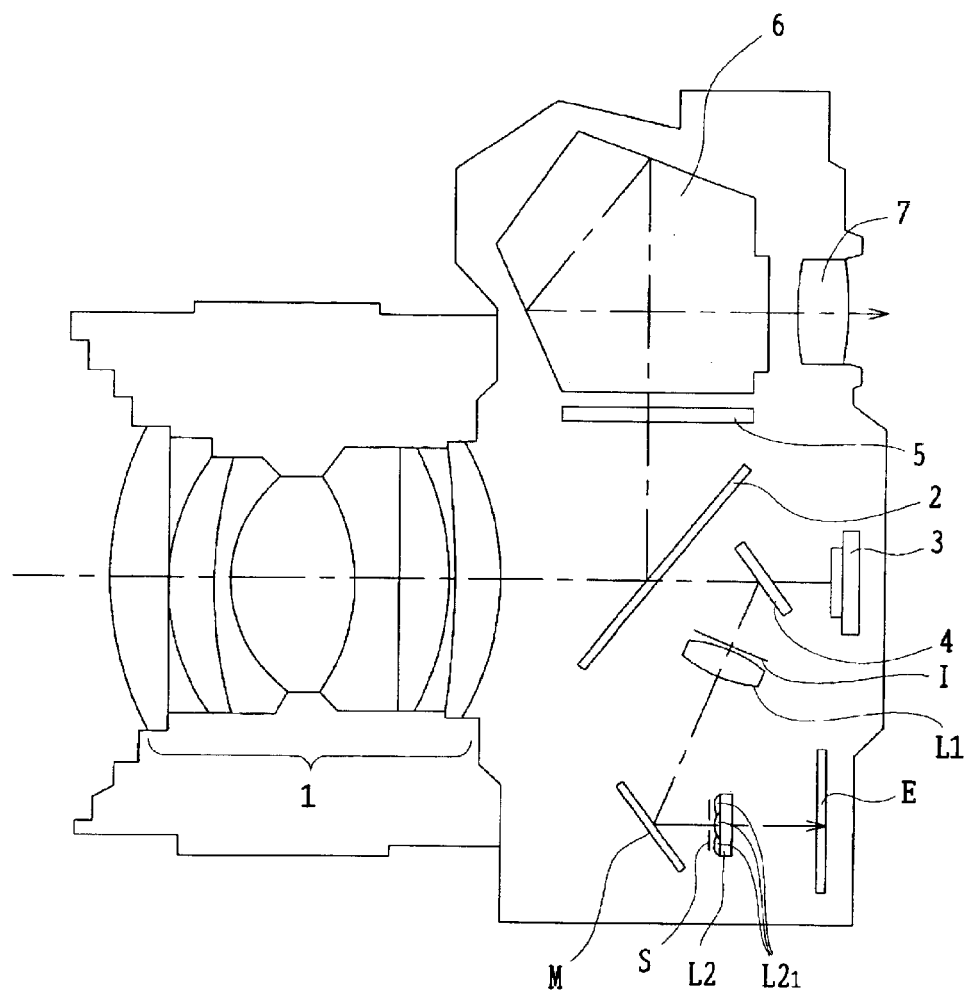
FIG. 4 is a view schematically showing a single-lens reflex digital camera using the focus detecting optical system of a fourth embodiment in the present invention.

Condition (7) determines compact bending of the optical path of the focus detecting optical system. In particular, this condition is such that, as shown in FIG. 4, when the optical path is bent into a Z-shape in the same plane through the mirror and the re-imaging optical system is interposed between the mirror and the photoelectric converting element array, the optimum position of the mirror is determined without increasing a fabrication cost and by the above combination with the plano-convex lenses.

Below the lower limit of Condition (7), the position of the mirror is shifted close to the condenser lens and thus the optical path behind the mirror becomes so long that a compact design of the focus-detecting optical system inside the camera body is obstructed. Beyond the upper limit of Condition (7), the re-imaging optical system becomes bulky and the fabrication cost is increased.

Also, although the optical system satisfies Conditions (2) and (3) and thereby chromatic aberration and the image height error are favorably corrected, it is necessary for the tolerance of the amount of aberration to satisfy Conditions (4) and (5) described below. This value is a target value of aberration in the present invention, but it is much smaller than in the conventional focus detecting optical system corresponding to 135F size.

Specifically, in order to favorably correct chromatic aberration, the focus detecting optical system of the present invention further includes a light receiving element having a light-receiving surface, and satisfies the following condition:

$$|\Delta| < 1.55\lambda \tag{4}$$

where $\Delta$ is the difference of the position of the center of gravity between spots of the C and F lines on the surface of the light-receiving element and $\lambda$ is a wavelength of the E line.

If the value of the difference $\Delta$ is below the lower limit of Condition (4), the position of range measurement will vary with the photographing scene due to chromatic aberration of the focus detecting optical system when various light sources are used in photography.

In the image height error, the focus detecting optical system of the present invention satisfies the following condition:

$$3.50 \times 10^{-4} > |\delta d/D| \tag{5}$$

where $\delta d$ is an image height error (mm) on the most peripheral side of a range measuring area and D is a distance (mm) between two images made by the pair of re-imaging lenses.

When the optical system satisfies Condition (5), an adverse influence of the image height error on range measuring accuracy is impaired. If the value of $|\delta d/D|$ is below the lower limit of Condition (5), the center of the range measuring area will be different in size of the image from the periphery thereof and the range measuring accuracy will be adversely affected when the relative positions of the two images formed on the light-receiving surface provided with the photoelectric converting element array by the secondary imaging lenses of the focus detecting optical system are detected to thereby find the focus position of the photographic lens.

It is further desirable that the focus detecting optical system further includes a light-receiving element having a light-receiving surface, and satisfies the following condition:

$$0.85 < LTL/fl < 1.75 \tag{6}$$

where LTL is the optical path length (a length from the preset imaging plane to the light-receiving surface) of the focus detecting optical system and fl is the focal length of the entire focus detecting optical system.

Condition (6) determines the optimum optical path length of the focus detecting optical system. When the optical system satisfies Condition (6), an almost optimum distance between the two images is obtained. In addition, the distance between the two images which provides a proper size of the photoelectric converting element array which is the light-receiving surface is derived, and the amount of defocus can be ensured to some degree without highly increasing the size of the photoelectric converting element array of the light-receiving surface. The above condition is also advantageous for correcting aberration.

Beyond the upper limit of Condition (6), the amount of production of chromatic aberration is increased, which constitutes one factor in the error of range measurement. Below the lower limit of Condition (6), it becomes difficult to make the exit pupil of the photographic lens coincide with the entrance pupil of the focus detecting optical system and eclipse is caused, which is unfavorable.

First Embodiment

Figure 1B:
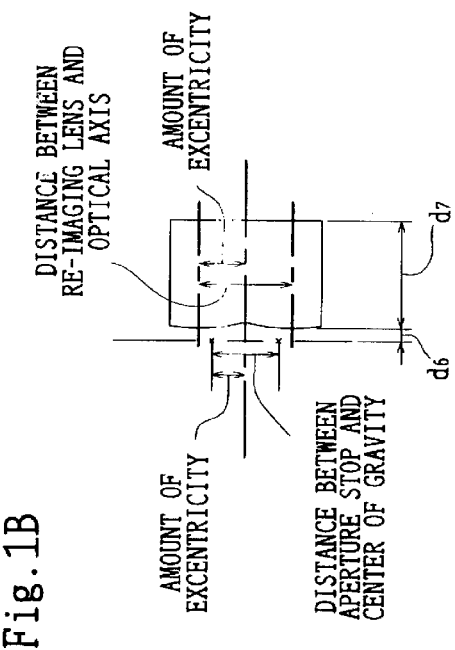
FIG. 1B is an explanatory view showing a distance between centers of gravity of aperture stops and a distance between optical axes of re-imaging lenses in FIG. 1A.

FIG. 1A shows an optical arrangement, developed along the optical axis, of the focus detecting optical system of the first embodiment in the present invention. FIG. 1B shows a distance between centers of gravity of aperture stops and a distance between optical axes of re-imaging lenses in FIG. 1A.

The focus detecting optical system of the first embodiment includes, in order from a preset imaging plane 1 equivalent to the imaging surface of a photographic lens, not shown in the figure, toward a photoelectric converting element array E, an infrared cutoff filter F, a condenser lens L1, an aperture stop unit S provided with a pair of aperture stops S1, a re-imaging optical system L2 in which a pair of re-imaging lenses L2₁ are integrally configured, and a cover glass CG. The photoelectric converting element array E is provided on the surface opposite to the entrance surface of the cover glass CG.

Each of the re-imaging lenses $L2_1$, as shown in FIG. 1B, is placed so that its optical axis is decentered farther away from the center of each of the aperture stops S1 with respect to the optical axis of the photographic lens. Also, the condenser lens and the re-imaging lenses are constructed so that their optical function surfaces are only spherical.

When aspherical surfaces are used as the optical function surfaces, at least one surface of the condenser lens, like the focus detecting optical system set forth, for example, in Kokai No. Sho 60-32012 or Sho 62-25715, is configured as an aspherical surface and thereby aberration produced in the condenser lens can be corrected.

However, if the amount of correction for aberration by the aspherical surface is increased, the sensitivity of the fabrication error becomes high. If the sensitivity is made low, the effect of correction for aberration by the aspherical surface will be lessened. Consequently, when the result of lens fabrication is taken into account for synthetic consideration, there is little merit that the surface of the condenser lens is configured as the aspherical surface.

In the optical system described in Kokai No. Sho 62-69217 (Publication No. Hei 7-31300) or Sho 62-79407, one surface of each re-imaging lens is decentered and thereby the effect of reducing chromatic aberration is brought about.

Thus, it is also conceivable that the optical function surface of this re-imaging lens is configured as the aspherical surface to share correction for aberration which cannot be completely done by configuring the optical function surface of the condenser lens as the aspherical surface.

The re-imaging optical system of this type, however, is constructed so that two or more re-imaging lenses which assume an even number are integrally molded at the same time, and has a distinct cost disadvantage in order to configure the optical function surface as the aspherical surface and keep decentering accuracy at a certain level. Furthermore, since the re-imaging lenses have a high sensitivity of the amount of decentration with respect to the distance between the two images formed through two re-imaging lenses, the fabrication error caused when the optical function surface of each re-imaging lens is configured as the aspherical surface directly affects the range measurement accuracy.

For the above reason, in the first embodiment and the second embodiment to be described later, the optical function surfaces of the condenser lens and the re-imaging lenses, constituting the focus detecting optical system, are constructed to be only spherical. However, if the problem of the sensitivity of the fabrication error can be solved, the aspherical surface can, of course, be used.

Subsequently, numerical data of optical members constituting the focus detecting optical system of the first embodiment are shown below.

In the numerical data of the first embodiment, $r_1, r_2, \ldots$ denote radii of curvature of surfaces of individual optical members; $d_1, d_2, \ldots$ denote thicknesses of individual optical members or air spacings between them; $n_{d1}, n_{d2}, \ldots$ denote refractive indices of individual optical members in the d line; $\nu_{d1}, \nu_{d2}, \ldots$ denote Abbe's numbers of individual optical members.

These symbols are also used for the numerical data of other embodiments to be described later.

Numerical Data 1

| Magnification: −0.51× | | | |
|---|---|---|---|
| $r_1 = \infty$ | (preset imaging plane) | | |
| | $d_1 = 160$ | | |
| $r_2 = \infty$ | (IR cutoff filter) | | |
| | $d_2 = 0.50$ | $n_{d2} = 1.53800$ | $\nu_{d2} = 64.0$ |
| $r_3 = \infty$ | | | |
| | $d_3 = 1.60$ | | |
| $r_4 = 16.36$ | (condenser lens) | | |
| | $d_4 = 2.00$ | $n_{d4} = 1.58423$ | $\nu_{d4} = 30.49$ |
| $r_5 = -16.36$ | | | |
| | $d_5 = 16.84$ | | |
| $r_6 = \infty$ | (aperture stop) | | |
| | $d_6 = 0.06$ | | |
| $r_7 = 3.49$ | (re-imaging lens) | | |
| | $d_7 = 2.84$ | $n_{d7} = 1.58423$ | $\nu_{d7} = 30.49$ |
| $r_8 = \infty$ | | | |
| | $d_8 = 5.57$ | | |
| $r_9 = \infty$ | (cover glass) | | |
| | $d_9 = 1.10$ | $n_{d9} = 1.516$ | $\nu_{d9} = 64.1$ |
| $r_{10} = \infty$ | (photoelectric converting element array) | | |

Distance between centers of gravity of aperture stops: 1.394 (Amount of decentration: 0.697) Distance between optical axes of re-imaging lenses: 1.474 (Amount of decentration 0.737)

(Parameters of Conditions)

Figure 2:
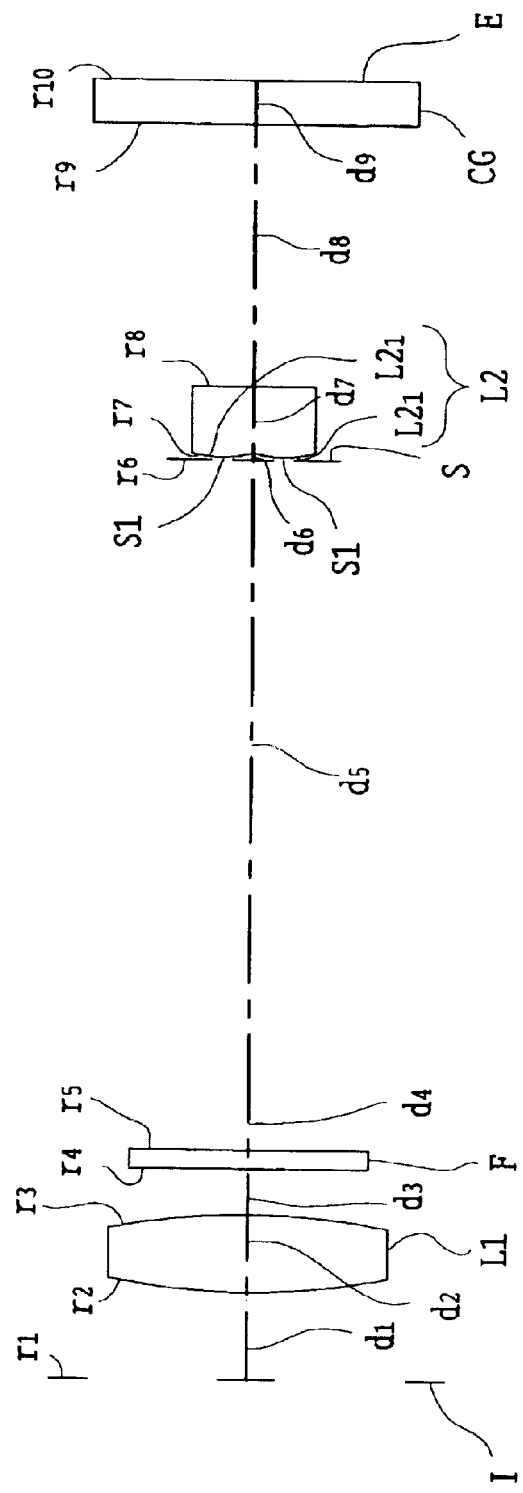
FIG. 2 is a sectional view showing an optical arrangement, developed along the optical axis, of the focus detecting optical system of a second embodiment in the present invention.

$|R1/R2|=1$ $|R3/R4|=0$ $LTL/fl=1.03$ $|\Delta/\lambda|=0.0025$ $|\delta d/D|=0.40 \times 10^{-4}$ Second Embodiment The focus detecting optical system of the second embodiment, as shown in FIG. 2, has almost the same arrangement as that of the first embodiment with the exception that the positions of the condenser lens L1 and the infrared cutoff filter F are reversed with respect to the first embodiment shown in FIG. 1A.

Subsequently, numerical data of optical members constituting the focus detecting optical system of the second embodiment are shown below.

Numerical Data 2

| Magnification: −0.60× | | | |
|---|---|---|---|
| $r_1 = \infty$ | (preset imaging plane) | | |
| | $d_1 = 3.32$ | | |
| $r_2 = 11.33$ | (condenser lens) | | |
| | $d_2 = 2.00$ | $n_{d2} = 1.58423$ | $\nu_{d2} = 30.49$ |
| $r_3 = =13.63$ | | | |
| | $d_3 = 12.26$ | | |
| $r_4 = \infty$ | (IR cutoff filter) | | |
| | $d_4 = 0.50$ | $n_{d4} = 1.53800$ | $\nu_{d4} = 64.0$ |
| $r_5 = \infty$ | | | |
| | $d_5 = 1.06$ | | |
| $r_6 = \infty$ | (aperture stop) | | |
| | $d_6 = 0.06$ | | |
| $r_7 = 2.91$ | (re-imaging lens) | | |
| | $d_7 = 3.50$ | $n_{d7} = 1.58423$ | $\nu_{d7} = 30.49$ |
| $r_8 = \infty$ | | | |
| | $d_8 = 5.40$ | | |
| $r_9 = \infty$ | (cover glass) | | |
| | $d_9 = 0.70$ | $n_{d9} = 1.516$ | $\nu_{d9} = 64.1$ |
| $r_{10} = \infty$ | (photoelectric converting element array) | | |

Distance between centers of gravity of aperture stops: 1.198 (Amount of decentration 0.589) Distance between optical axes of re-imaging lenses: 1.324 (Amount of decentration 0.662)

(Parameters of Conditions)

$|R1/R2|=0.83$ $|R3/R4|=0$ $LTL/fl=1.64$ $|\Delta/\lambda|=1.34$ $|\delta d/D|=1.53\times10^{-4}$ Third Embodiment The focus detecting optical system of the third embodiment, like the second embodiment, has almost the same arrangement as that of the first embodiment with the exception that the positions of the condenser lens L1 and the infrared cutoff filter F are reversed with respect to the first embodiment shown in FIG. 1A. Also, the figure of the third embodiment is omitted.

Subsequently, numerical data of optical members constituting the focus detecting optical system of the third embodiment are shown below.

Numerical data 3

| Magnification: −0.51× | | | |
|---|---|---|---|
| $r_1 = \infty$ | (preset imaging plane) | | |
| | $d_1 = 3.32$ | | |
| $r_2 = 15.88$ | (condenser lens) | | |
| | $d_2 = 2.00$ | $n_{d2} = 1.52542$ | $v_{d2} = 55.78$ |
| $r_3 = -14.96$ | | | |
| | $d_3 = 15.44$ | | |
| $r_4 = \infty$ | (IR cutoff filter) | | |
| | $d_4 = 0.50$ | $n_{d4} = 1.516$ | $v_{d4} = 64.1$ |
| $r_5 = \infty$ | | | |
| | $d_5 = 1.06$ | | |
| $r_6 = \infty$ | (aperture stop) | | |
| | $d_6 = 0.06$ | | |
| $r_7 = 2.91$ | (re-imaging lens) | | |
| | $d_7 = 3.23$ | $n_{d7} = 1.52542$ | $v_{d7} = 55.78$ |
| $r_8 = \infty$ | | | |
| | $d_8 = 6.03$ | | |
| $r_9 = \infty$ | (cover glass) | | |
| | $d_9 = 0.70$ | $n_{d9} = 1.516$ | $v_{d9} = 64.1$ |
| $r_{10} = \infty$ | (photoelectric converting element array) | | |

Distance between centers of gravity of aperture stops: 1.424 (Amount of decentration: 0.712) Distance between optical axes of re-imaging lenses: 1.440 (Amount of decentration: 0.770)

(Parameters of Conditions)

$|R1/R2|=1.06$ $|R3/R4|=0$ $LTL/fl=1.28$ $|\Delta/\lambda|=0.93$ $|\delta d/D|=1.66\times10^{-4}$ Also, each of the above embodiments is constructed to have the pair of aperture stops S1 and the pair of re-imaging lenses L2₁ as the optical system corresponding to the range measurement from a lateral direction at the center of the image plane. The pair of aperture stops and the pair of re-imaging lenses are provided in each embodiment, but when the aperture stops and the re-imaging lenses are arranged as respective pluralities of sets in pairs, a multiple range measurement type focus detecting optical system can be constructed.

Figure 3A:
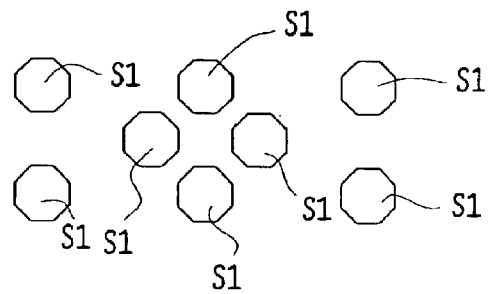
FIGS. 3A, 3B, and 3C are explanatory views diagrammatically showing patterns of aperture stops where the focus detecting optical system of the present invention is constructed as a multiple range measurement type focus detecting optical system.
Figure 3B:
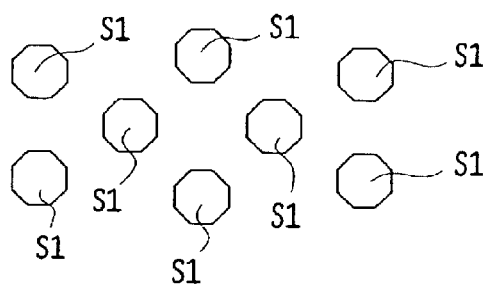
Figure 3C:
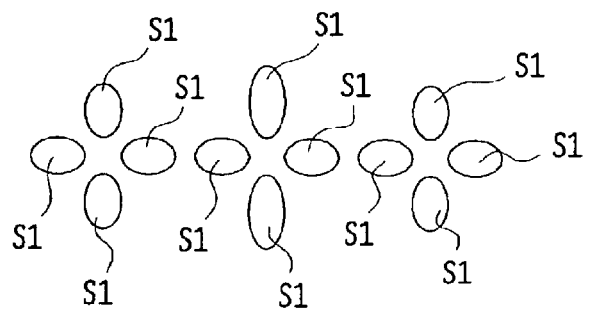

FIGS. 3A–3C show the patterns of the aperture stops where the focus detecting optical system of the present invention is constructed as the multiple range measurement type focus detecting optical system.

The aperture stops shown in FIG. 3A are arranged to correspond to range measurements in vertical and lateral directions at the center of the image plane and in a vertical direction on the periphery of the image plane. Distances between individual pairs of apertures are set to be exactly the same. When the aperture stops of FIG. 3A are used, distances between individual pairs of re-imaging lenses corresponding thereto are also set to be the same, and a plurality of sets of optical systems can be constructed. Moreover, since it is only necessary to arrange identical optical systems, there are great merits in fabrication and cost. The sizes of the aperture stops, the distances between them, and the distances between the optical axes of the re-imaging lenses at the position of the range measurement may be set to vary with the size of the photoelectric converting element array of the light-receiving surface.

The aperture stops shown in FIG. 3B are arranged to correspond to range measurements in vertical and lateral directions at the center of the image plane and in a vertical direction on the periphery of the image plane. However, unlike the aperture stops of FIG. 3A, the distance between the pair of aperture stops, namely the distance between the centers of gravity of the aperture stops, at the center is different from that on the periphery.

Alternatively, in order to make the aperture stops correspond to the range measurements in vertical and lateral directions at the center of the image plane and in vertical and lateral directions on the periphery thereof, it is conceivable that the aperture stops are arranged as shown in FIG. 3C. In the aperture stops shown in FIG. 3C, a pair of aperture stops are provided in each of the vertical and lateral directions at the center and the vertical and lateral directions on the periphery so that the distance between (the centers of gravity of) the pair of aperture stops and their shapes are optimized. The aperture stop is capable of assuming any of the shapes of FIGS. 3A, 3B, and 3C in accordance with the optical system to be combined.

As mentioned above, in accordance with the photoelectric converting element array in the direction of the range measurement, the aperture stops are arranged to have the optimum distances and directions, and the re-imaging lenses are arranged so that the distance between the optical axes of a pair of re-imaging lenses is optimized with respect to the aperture stops. Whereby, aberrations can be minimized. Moreover, the distance between the two images can be made proper with respect to each of the center and periphery of the image plane and a suitable defocus range can be ensured. Subsequently, reference is made to an embodiment of a camera using the focus detecting optical system of the present invention, stated above.

Fourth Embodiment

Figure 5:
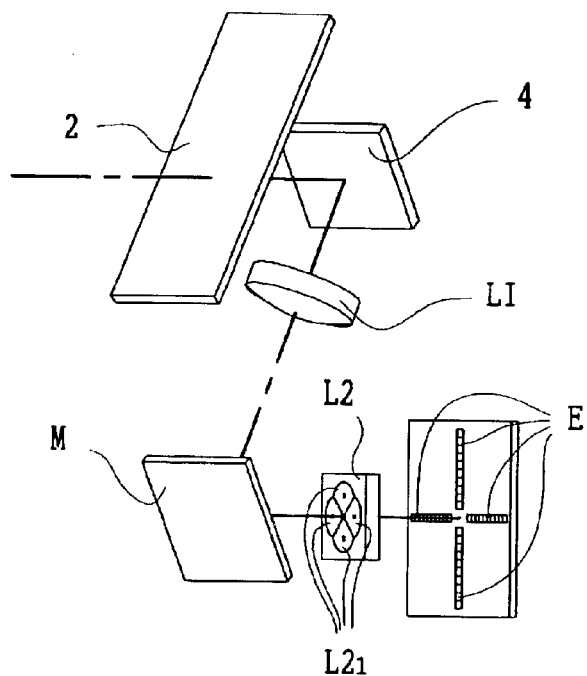
FIG. 5 is a perspective view showing essential parts of the focus detecting optical system in FIG. 4.
Figure 6:
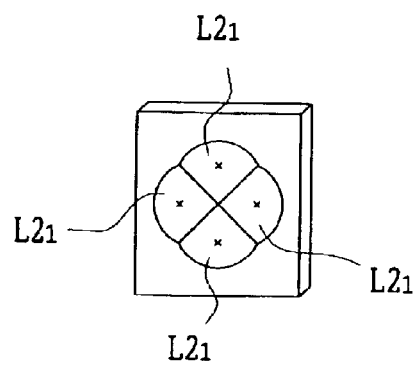
FIG. 6 is an explanatory view schematically showing a re-imaging optical system.

FIG. 4 shows a single-lens reflex digital camera using the focus detecting optical system of the fourth embodiment in the present invention. FIG. 5 shows essential parts of the focus detecting optical system in FIG. 4. FIG. 6 shows the re-imaging optical system.

The camera of this embodiment, as shown in FIG. 4, has an imaging optical system, a finder optical system, and the focus detecting optical system.

The imaging optical system includes a photographic lens 1, a half mirror 2, and a reflecting mirror 4, arranged in this order along the optical path. The photographic lens 1 is constructed to be movable in and out of a camera body through a mount. The half mirror 2 is constructed so that the optical path from the photographic lens 1 is split into two paths directed toward an image sensor 3 and the finder optical system. The half mirror 2 is also constructed as a quick-return mirror raised up in association with a shutter, not shown. The reflecting mirror 4 is constructed to conduct light from the photographic lens 1 to the focus detecting optical system. The reflecting mirror 4 is also constructed so that it is raised up in association with the half mirror 2. The reflecting mirror 4, when raised up, is moved out of the optical path so that the light from the photographic lens 1 is conducted to the image sensor 3. Thus, the optical path from the photographic lens 1 can be switched to follow the directions of the image sensor and the focus detecting optical system.

The focus detecting optical system, as shown in FIG. 4, includes the condenser lens L1 placed in the proximity of the preset imaging plane 1 equivalent to the imaging plane of the photographic lens 1; a reflecting mirror M bending light from the condenser lens L1, compactly housed in the camera body; a combination of the aperture stop unit S having the pair of aperture stops S1 in each of vertical and lateral directions with the re-imaging optical system L2 in which the re-imaging lenses $L2_1$ are integrally configured, corresponding to the aperture stops S1; and the photoelectric converting element array E.

The re-imaging optical system L2, as shown in FIGS. 5 and 6, is constructed so that the re-imaging lenses are integrated to have the pair of re-imaging lenses $L2_1$ in each of the vertical and lateral directions in accordance with the orientation of the photoelectric converting element array E. Also, the aperture stop unit S is omitted from FIG. 5.

In the combination of the pair of aperture stops S1 with the pair of re-imaging lenses $L2_1$ corresponding thereto, the centers of the aperture stops S1 and the re-imaging lenses $L2_1$ are decentered from the optical axis of the photographic lens 1. The amount of decentration varies with each set (the combination of the vertical direction with the lateral direction in the fourth embodiment).

The construction of the focus detecting optical system other than the above description is substantially the same as that of the focus detecting optical system disclosed in the first to third embodiments. The finder optical system has a screen 5 located at the position of the preset imaging plane equivalent to the imaging plane of the photographic lens 1 on the optical path reflected by the half mirror 2, a pentagonal roof prism 6, and an eyepiece 7. The camera of the fourth embodiment is provided with a display, such as an LCD, peculiar to the digital camera; a memory for recording images; and an infrared cutoff filter, although they are omitted from the figure.

In the digital camera of the fourth embodiment constructed as mentioned above, light from the photographic lens 1 is incident on the half mirror 2. The light reflected by the half mirror 2 is observed with the unaided eye through the finder optical system. The light transmitted through the half-mirror 2 is reflected by the reflecting mirror 4, and after passing through the focus detecting optical system, is used for the range measurement in accordance with a signal output by a range measurement switch provided in a shutter button, not shown. Upon exposure, the reflecting mirror 4 is raised up in association with the half mirror 2, and the half mirror 2 and the reflecting mirror 4 are moved out of the optical path of the photographic optical system. Whereby, light with the maximum brightness is received by the light-receiving surface of the image sensor 3.

If sufficient brightness is ensured, a half mirror 2, instead of the reflecting mirror 4, may be used and fixed. Alternatively, the half mirror 2 of a path splitting means may be fixed. As the photoelectric converting element in the focus detecting optical system, a CCD (a solid-state image sensor) or a CMOS sensor can be used. In this case, it can be used one-dimensionally or two-dimensionally, but in view of cost performance, it is desirable to use the photoelectric converting element array which is made in one-dimensional line.

The focus detecting optical system of the present invention, which is suitable for the camera using the image sensor, is also applicable to a camera using a smaller film than 135F or APF size.

What is claimed is:

1. A focus detecting optical system detecting a focus position of a photographing optical system from a positional relationship between at least one pair of secondary object images, wherein the focus detecting optical system comprises:

a condenser lens placed in the proximity of a preset imaging plane equivalent to an imaging plane of a photographic lens;

a pair of aperture stops that are placed on an exit side of the condenser lens and that divide a pupil of the photogrphic lens into two areas; and a pair of re-imaging lenses for forming two secondary object images corresponding to the aperture stops, and satisfies the following conditions:

$0.45 < |mg| < 0.75$ $0.75 < |R1/R2| < 1.25$ $|R3/R4| \leq 0.02$ where mg is an imaging magnification of the focus detecting optical system, R1 is a radius of curvature of an entrance surface of the condenser lens, R2 is a radius of curvature of an exit surface of the condenser lens, R3 is a radius of curvature of an entrance surface of each of the re-imaging lenses, and R4 is a radius of curvature of an exit surface of each of the re-imaging lenses.

2. A focus detecting optical system according to claim 1, further comprising a light receiving element having a light-receiving surface, and satisfying the following condition:

$|\Delta| < 1.55\lambda$ where $\Delta$ is a difference of a position of a center of gravity between spots of C and F lines on the surface of the light-receiving element and $\lambda$ is a wavelength of the E line.

3. A focus detecting optical system according to claim 1, further satisfying the following condition:

$3.50 \times 10^{-4} > |\delta d/D|$ where $\delta d$ is an image height error (mm) on a most peripheral side of a range measuring area and D is a distance (mm) between two images made by the pair of re-imaging lenses.

4. A focus detecting optical system according to claim 1, wherein a plurality of sets, each of which is a combination of the pair of aperture stops with the pair of re-imaging lenses corresponding thereto, so that, in each set, centers of the aperture stops and the re-imaging lenses corresponding thereto are decentered from an optical axis of the photographic lens and an amount of decentration varies with each set.

5. A focus detecting optical system according to claim 1, further comprising a light-receiving element having a light-receiving surface, and satisfying the following condition:

$0.85 < LTL/fl < 1.75$ where LTL is an optical path length (a length from the preset imaging plane to the light-receiving surface) of the focus detecting optical system and fl is a focal length of an entire focus detecting optical system.

6. A focus detecting optical system according to claim 1, wherein the re-imaging lenses are placed so that an optical axis of each of the re-imaging lenses is decentered farther away from a center of each of the aperture stops with respect to the optical axis of the photographic lens.

7. A camera comprising:

a focus detecting optical system;

a finder optical system;

a photographic lens;

path splitting means splitting an optical path from the photographic lens to direct the optical path toward an image sensor or a film and toward the finder optical system; and a reflecting means conducting the optical path of the photographic lens to the focus detecting optical system, the focus detecting optical system detecting a focus position of a photographing optical system from a positional relationship between at least one pair of secondary object images, wherein the focus detecting optical system comprises:

a condenser lens placed in the proximity of a preset imaging plane equivalent to an imaging plane of a photographic lens;

a pair of aperture stops that are placed on an exit side of the condenser lens and that divide a pupil of the photographic lens into two areas; and a pair of re-imaging lenses for forming two secondary object images corresponding to the aperture stops, and satisfies the following conditions:

$$0.45 < |mg| < 0.75$$

$$0.75 < |R1/R2| < 1.25$$

$$|R3/R4| \leq 0.02$$

where mg is an imaging magnification of the focus detecting optical system, R1 is a radius of curvature of an entrance surface of the condenser lens, R2 is a radius of curvature of an exit surface of the condenser lens, R3 is a radius of curvature of an entrance surface of each of the re-imaging lenses, and R4 is a radius of curvature of an exit surface of each of the re-imaging lenses.

8. A camera according to claim 7, wherein a diameter of an image circle of the camera is substantially a half of the diameter of the image circle of a 135 format camera.

9. A camera according to claim 7, further comprising the image sensor placed on the optical path of the photographic lens.

10. A camera comprising:

an image sensor provided with a light-receiving surface receiving light from a photographing optical system; and a focus detecting optical system detecting a focus position of the photographing optical system from a positional relationship between at least one pair of secondary image objects with light from the photographing optical system, wherein a diameter of an image circle of the camera is substantially a half of the diameter of the image circle of a 135 format camera.

11. A camera according to claim 10, wherein the focus detecting optical system satisfies the following condition:

$$0.45 < |mg| < 0.75$$

where mg is an imaging magnification of the focus detecting optical system.

12. A camera according to claim 10, further comprising a reflecting mirror reflecting the light from the photographing optical system to conduct the light to the focus detecting optical system.

13. A camera according to claim 12, wherein the reflecting mirror is moved to conduct the light from the photographing optical system to the image sensor.

* * * * *